US012470420B1

(12) United States Patent
Botes et al.

(10) Patent No.: US 12,470,420 B1
(45) Date of Patent: Nov. 11, 2025

(54) DEVICE-BASED CONFERENCE PROFILE CONFIGURATION

(71) Applicant: Zoom Communications, Inc., San Jose, CA (US)

(72) Inventors: Petrus Jacobus Botes, Aubrey, TX (US); Thanh Le Nguyen, Belle Chasse, LA (US); Steven Carl Rivers, Wyoming, MI (US)

(73) Assignee: Zoom Communications, Inc., San Jose, CA (US)

( * ) Notice: Subject to any disclaimer, the term of this patent is extended or adjusted under 35 U.S.C. 154(b) by 219 days.

(21) Appl. No.: 18/361,206

(22) Filed: Jul. 28, 2023

(51) Int. Cl.
*H04L 12/18* (2006.01)
*G06T 5/70* (2024.01)
*H04N 7/15* (2006.01)

(52) U.S. Cl.
CPC ............ *H04L 12/1818* (2013.01); *G06T 5/70* (2024.01); *H04N 7/157* (2013.01)

(58) Field of Classification Search
CPC . H04L 12/1818; H04L 12/1831; H04L 51/02; H04L 65/403; G06T 5/70; H04N 7/157; H04N 7/152; H04N 7/155; H04N 7/15; H04N 21/4788; G06Q 2220/00; G06Q 10/101; G06Q 10/103; G06Q 10/109; G06Q 30/01; G06Q 30/018; G06Q 50/01; G06F 9/453; G06F 40/35; G06N 3/006; G06N 3/045
See application file for complete search history.

(56) References Cited

U.S. PATENT DOCUMENTS

| | | | |
|---|---|---|---|
| 9,024,997 B2 | 5/2015 | Kumar et al. | |
| 10,686,661 B2* | 6/2020 | Ben-Haim | H04W 48/20 |
| 11,386,168 B2 | 7/2022 | Ricci | |
| 11,563,916 B2 | 1/2023 | Pell | |
| 11,665,215 B1 | 5/2023 | Zavesky et al. | |
| 12,105,778 B2* | 10/2024 | Freckleton | G01C 19/00 |
| 12,141,903 B1 | 11/2024 | Reynolds et al. | |
| 2007/0294263 A1 | 12/2007 | Punj et al. | |
| 2011/0271207 A1 | 11/2011 | Jones et al. | |
| 2013/0166643 A1* | 6/2013 | Essas | H04L 51/52 709/204 |
| 2018/0213364 A1 | 7/2018 | Segal et al. | |
| 2021/0076002 A1 | 3/2021 | Peters et al. | |
| 2023/0244799 A1 | 8/2023 | Sharma | |

(Continued)

FOREIGN PATENT DOCUMENTS

WO 2011136794 A1 11/2011

*Primary Examiner* — Phung-Hoang J Nguyen
(74) *Attorney, Agent, or Firm* — Young Basile Hanlon & MacFarlane, P.C.

(57) ABSTRACT

Devices connected to a user device and usable in configuring a conferencing application are identified. A selection of one of the devices is received. A conference profile that indicates to use the selected device is stored in association with a profile identification criterion. A request to connect the user device to a conference using the conferencing application is received. The profile identification criterion is determined to be satisfied based on receiving the request. In response to determining that the profile identification criterion is satisfied, the conference profile is retrieved. The conferencing application is configured, based on the conference profile, to use the selected device during the conference.

20 Claims, 10 Drawing Sheets

(56) References Cited

U.S. PATENT DOCUMENTS

| | | |
|---|---|---|
| 2024/0223625 A1 | 7/2024 | Jia et al. |
| 2024/0275838 A1 | 8/2024 | Werner et al. |
| 2024/0314242 A1 | 9/2024 | Mohammad |

* cited by examiner

```
<PROFILE>
    <NAME>PRESENTING AT THE OFFICE</NAME>
    <DEVICES>
        <MONITORS>
            <PROJECTOR ORDER="1">
                <NAME>CO_ONE C2020H PROJECTOR</NAME>
                <UNIQUE_ID>USB\VID_046D&PID_0927&REV_0100</UNIQUE_ID>
            </PROJECTOR>
            <MONITOR ORDER="2">
                <NAME>CO_TWO U2412M MONITOR</NAME>
                <UNIQUE_ID>ACPI\VEN_CO_TWO&DEV_0C4E&SUBSYS_00000000&REV_A0</UNIQUE_ID>
            </MONITOR>
            <MONITOR ORDER="4">
                <NAME>BUILT-IN</NAME>
            </MONITOR>
        </MONITORS>
        <SPEAKERS>
            <SPEAKER ORDER="1">
                <NAME>CO_THREE Z333 MULTIMEDIA SPEAKERS</NAME>
                <UNIQUE_ID>USB\VID_046D&PID_0927&REV_0100</UNIQUE_ID>
            </SPEAKER>
            <SPEAKER ORDER="2">
                <NAME>BUILT-IN</NAME>
            </SPEAKER>
        </SPEAKERS>
        ●●●
    </DEVICES>
</PROFILE>
```

FIG. 9

DEVICE-BASED CONFERENCE PROFILE CONFIGURATION

FIELD

This disclosure relates generally to video conferencing and, more specifically, to configuring peripheral devices based on conference profiles.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 9 illustrates an example of contents of a conference profile.

DETAILED DESCRIPTION OF THE DRAWINGS

Figure 1:
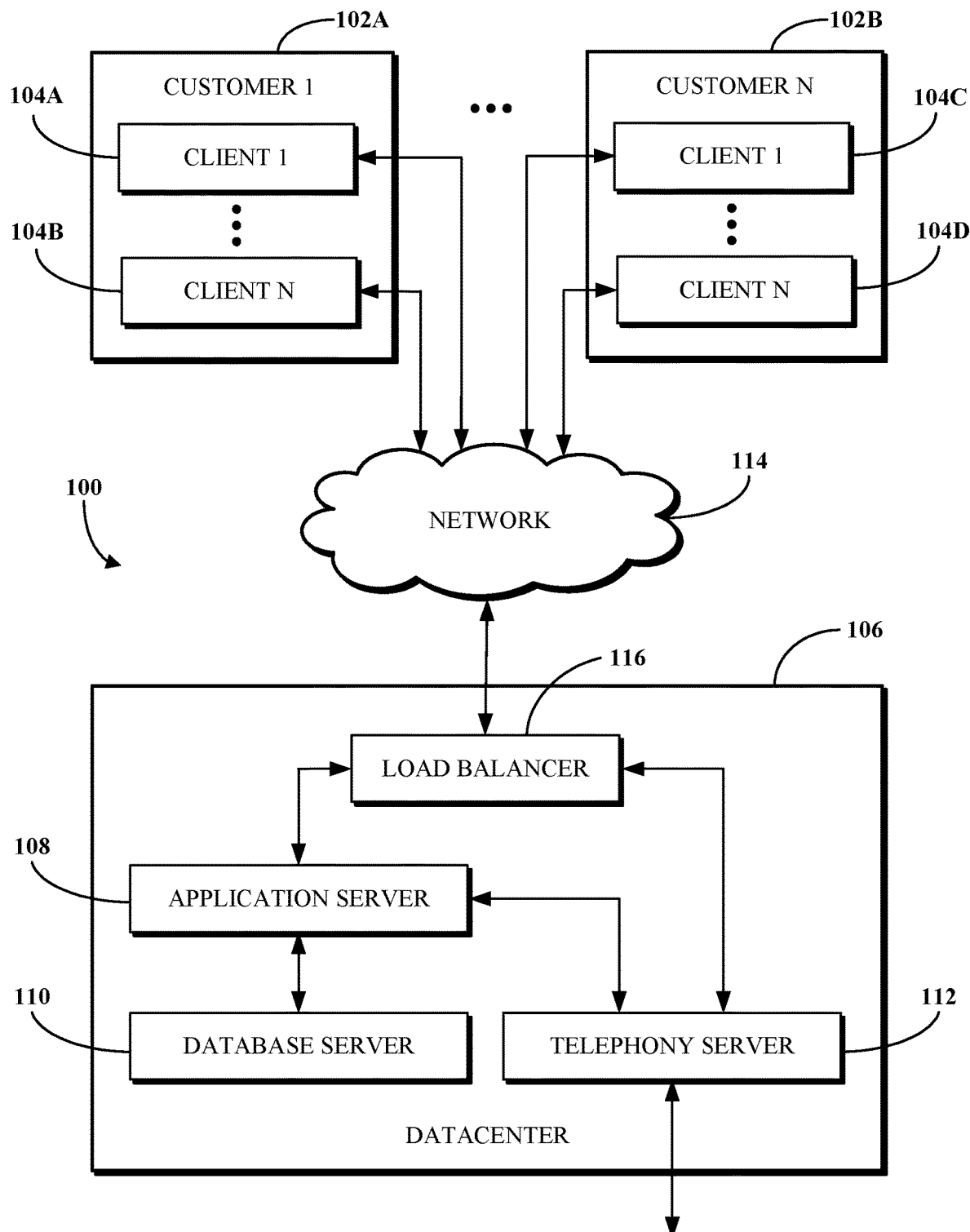
FIG. 1 is a block diagram of an example of an electronic computing and communications system.

Enterprises rely upon several modes of communication to support their operations, including telephone, email, internal messaging, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises systems, meaning that remote workers and those who are generally increasingly mobile may be unable to rely upon them. One type of system which addresses problems such as these includes a unified communications as a service (UCaaS) platform, which includes several communications services integrated over a network, such as the Internet, to deliver a complete communication experience regardless of physical location. As such, a UCaaS can be a cloud-based platform that implements or enables a suite of integrated communication and collaboration applications and services.

Individuals (referred to herein as users) may use software, such as a UCaaS platform, to communicate and collaborate remotely in virtual meetings, also referred to herein as conferences. These conferences may be audio-only or involve audio and video media. When a user joins a conference (i.e., connects their device to the conference), they can use various input/output devices or software tools to communicate with other participants. These devices, which may be integrated peripherals built into the user's device (e.g., a laptop, desktop, or mobile phone) or be external peripherals, facilitate communication during the conference. For example, during a video conference, a user may use a built-in or external camera, microphone, speakers, and display. Alternative peripheral devices, such as an external speaker, a headset, a front-facing camera, or a side camera, could also be utilized to enhance the user's communication capabilities during the conference.

Traditional software tools, including those integrated within standard software platforms, typically require a user to either utilize a default set of peripheral devices for conferencing, or to manually switch the peripheral devices upon joining or during a conference. This manual adjustment can involve a multitude of steps, such as navigating through a graphical user interface (GUI) to locate an appropriate menu, and cycling through various peripheral devices until the user identifies their preferred choice. In scenarios where a user may already have an optimal set of peripheral devices configured to their preferences, challenges may arise when they relocate their user device to a different physical location, such as when moving from an office to a conference room, or transitioning from a remote workspace to an on-site location.

Under such circumstances, the user may be compelled to either settle for the default peripheral devices linked with their computer or manually adjust to the devices available within the new environment. Settling for default peripheral devices, when higher quality or more convenient ones are available, may result in a less efficient and/or lower quality meeting experience for the user and/or other participants. Meanwhile, manually altering the peripheral devices can cause disruptions in a conference. Therefore, these conventional methods may pose significant challenges in terms of productivity and user experience.

Implementations of this disclosure address problems such as these by implementing conference profiles (also referred to as roaming profiles, or, for brevity, profiles) associated with the different hardware that a participant could use during a conference. A "conference profile" can be described as a predefined set of hardware devices or peripherals (e.g., such as input/output devices or peripherals) that are utilized together to enable a streamlined conferencing or meeting experience for a user. A conferencing software platform that implements conference profiles facilitates seamless transitions between various meeting environments or requirements. Each device collection (i.e., conference profile) can be a tailored configuration of hardware settings that optimize the user's participation in a conference.

A particular one of conference profiles may be automatically selected based on an identified condition associated with the conference or the user satisfying profile selection criteria associated with the particular conference profile. The identified condition may include or based on or more of a date, a time, a location of the user, or an activity associated with the conference, a geolocation, a calendar, a preference, or an activity of the participant. That is, which conference profile is selected for a conference can depend on the user's location (which may be inferred based on the location of the user device that the used for joining the conference) or the nature of the conference they are participating in. To illustrate, one device collection configured with high-grade equipment may be selected when the user is attending conferences from their office location, and another for mobile use (such as when the user is attending a conference while driving).

As further described herein, conference profiles may not be limited to physical devices usable in conferences. In some examples, conference profiles may settings related to software features. For example, a conference profile may include configurations of features of a conferencing application via which a user attends (or otherwise participates in) conferences. To illustrate, the configurations may include settings of a virtual background feature, whether sound filtering is used, window layouts when in presentation mode, and the like.

In some implementations, a conference profile associated with a user of a conference is identified. The conference profile specifies a peripheral device connected to a user device of the user and used to connect to the conference via a conferencing application. The conference profile is identified by a machine-learning model based on a current state associated with at least one of the conference or the user. The conferencing application is configured to use the peripheral device during the conference based on the conference profile.

In other implementations, devices connected to a user device and usable in configuring a conferencing application are identified. A selection of one of the devices is received. A conference profile that indicates to use the selected device is stored in association with profile identification criteria. A request to connect the user device to a conference is received. The profile identification criteria are determined to be satisfied based on receiving the request to connect the user device to the conference. In response to determining that the profile identification criteria are satisfied, the conference profile is retrieved. The conferencing application is configured, based on the conference profile, to use the selected device.

To describe some implementations in greater detail, reference is first made to examples of hardware and software structures used to implement a system for configuring devices based on conference profiles. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, one or more of the clients 104A through 104D or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106. For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
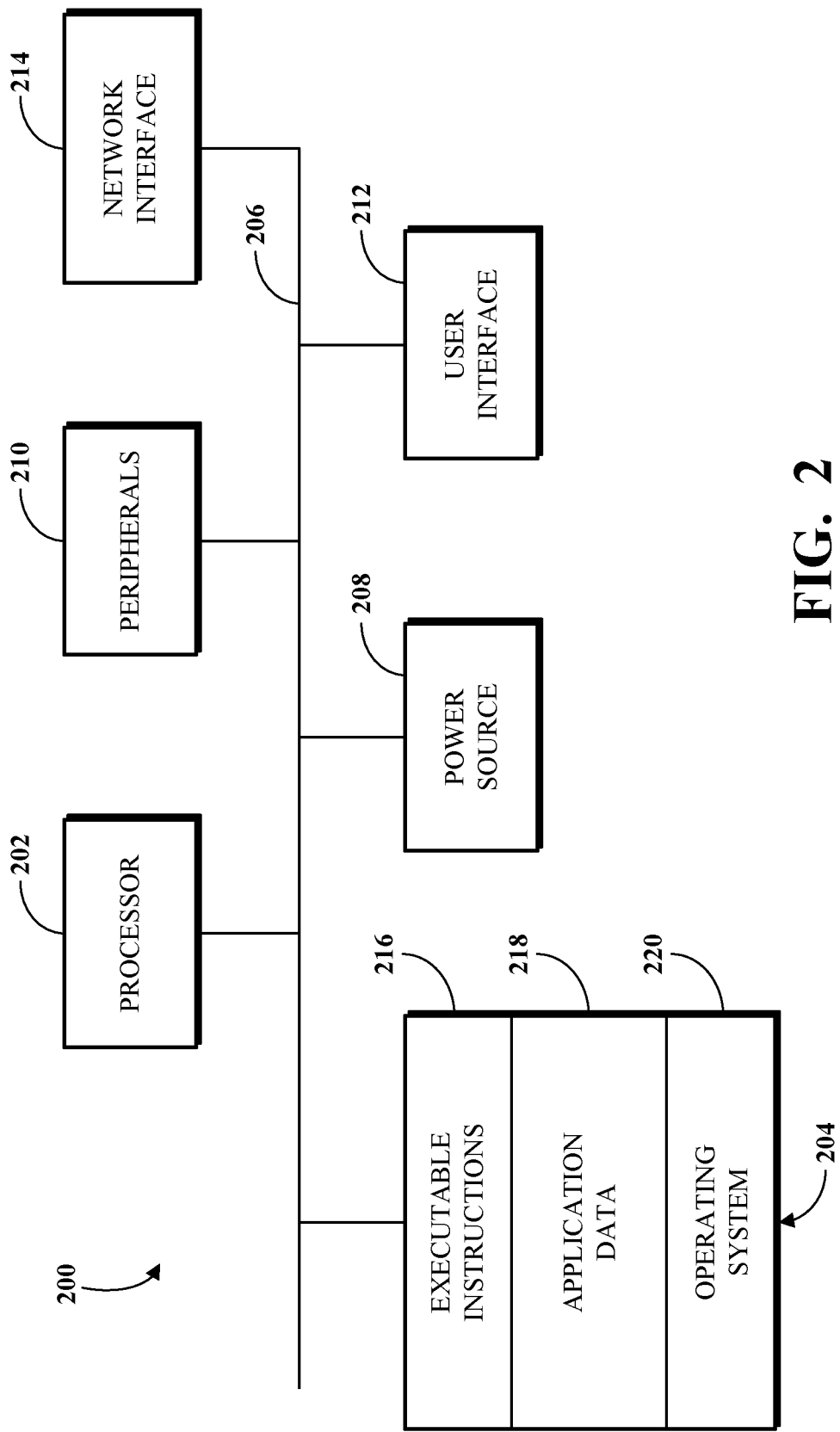
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the clients 104A through 104D, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be RAM (e.g., a DRAM module, such as DDR DRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
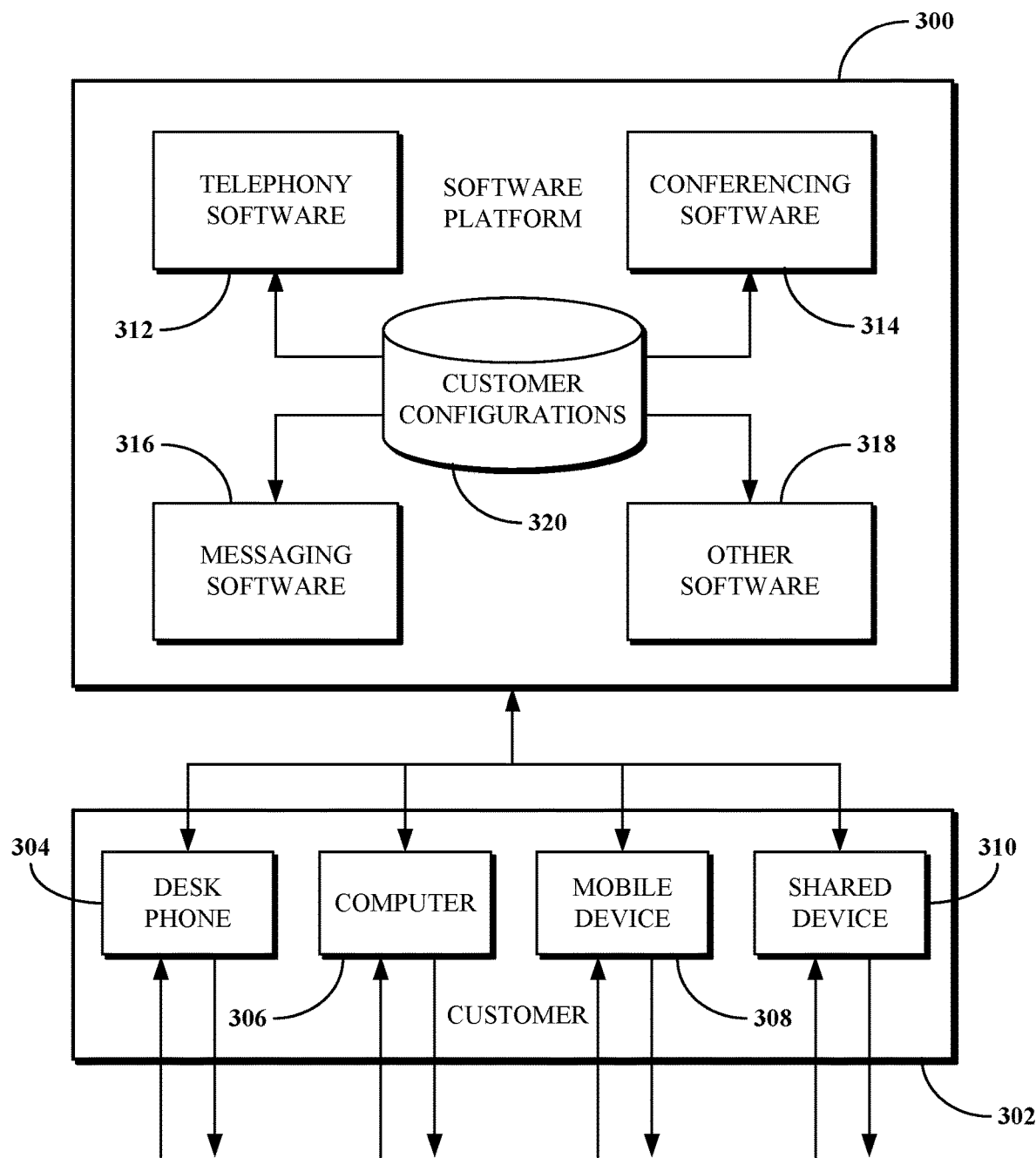
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients 304 through 310 (e.g., the clients 304, 306, 308, 310)-a desk phone, a computer, a mobile device, and a shared device. The desk phone is a desktop unit configured to at least send and receive calls and includes an input device for receiving a telephone number or extension to dial to and an output device for outputting audio and/or video for a call in progress. The computer is a desktop, laptop, or tablet computer including an input device for receiving some form of user input and an output device for outputting information in an audio and/or visual format. The mobile device is a smartphone, wearable device, or other mobile computing aspect including an input device for receiving some form of user input and an output device for outputting information in an audio and/or visual format. The desk phone, the computer, and the mobile device may generally be considered personal devices configured for use by a single user. The shared device is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, amongst the clients 304 through 310 be sent or received using the desk phone, a softphone running on the computer, a mobile application running on the mobile device, or using the shared device that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include software for configuring devices based on conference profiles. In some such cases, the conferencing software 314 may include some or all of the other software 318.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some, or all, of the software 312 through 318 may be combined into a single software application run on clients of the customer, such as one or more of the clients 304 through 310.

Figure 4:
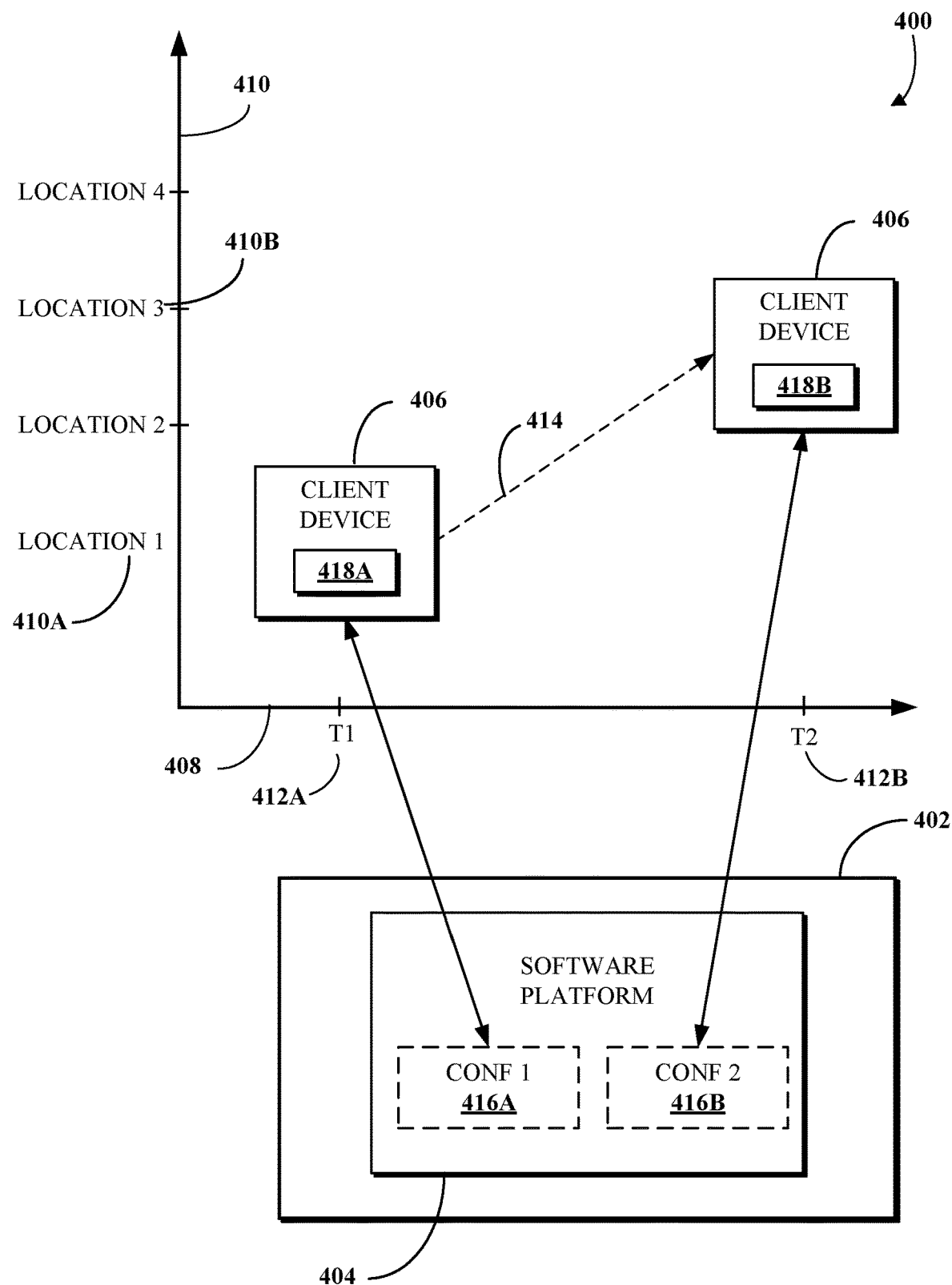
FIG. 4 is an example of an environment where conference profiles can be used.

FIG. 4 is an example of an environment 400 where conference profiles can be used. The environment 400 includes a server 402 that implements a software platform 404, which may be, for example, the software platform 300 of FIG. 3. As such, the server 402 includes or implements conferencing services that may be provided or enabled by a conferencing software, such as the conferencing software 314 of FIG. 3. A client device 406, which can be one of the clients 304 through 310 of FIG. 3, can connect to conferences hosted (i.e., enabled) by the software platform 404. A conferencing application (not shown) may execute (or is otherwise available) at the client device 406 via which the client device 406 connects to conferences.

An x-axis 408 represents the passage of time and a y-axis 410 represents different locations, including a location 410A and a location 410B, that the client device 406 may be physically located at (e.g., moved to). The environment 400 illustrates that at a time T1 (e.g., a time 412A) the client device 406 was at the location 410A and that at a time T2 (e.g., a time 412B), the client device 406 was moved (as illustrated by a movement 414) to the location 410B.

While the client device 406 was at the location 410A, the client device 406 connected to a conference 416A; and while the client device 406 was at the location 410B, the client device 406 connected to a conference 416B. While the client device 406 was connected to the conference 416A and the conference 416B, a conference profile 418A and a conference profile 418B were used, respectively, to configure (e.g., enable or set up) devices of the client device 406 for use during the conferences 416A and 416B, respectively, and/or configure other features associated with the conferencing application.

The conference profiles 418A and 418B may be selected from amongst available conference profiles by or using a profile selector software (not shown in FIG. 4). The profile selector software is further described with respect to FIG. 5. The profile selector software may be available or executing at or by the client device 406. The profile selector software may be available or executing at or by the software platform 404. The available conference profiles may be stored at the client device 406. The available conference profiles may be stored in a database associated with the software platform 404. In an example, the available conference profiles may be stored within a database or other data store at a database server, such as the database server 110 shown in FIG. 1.

Figure 5:
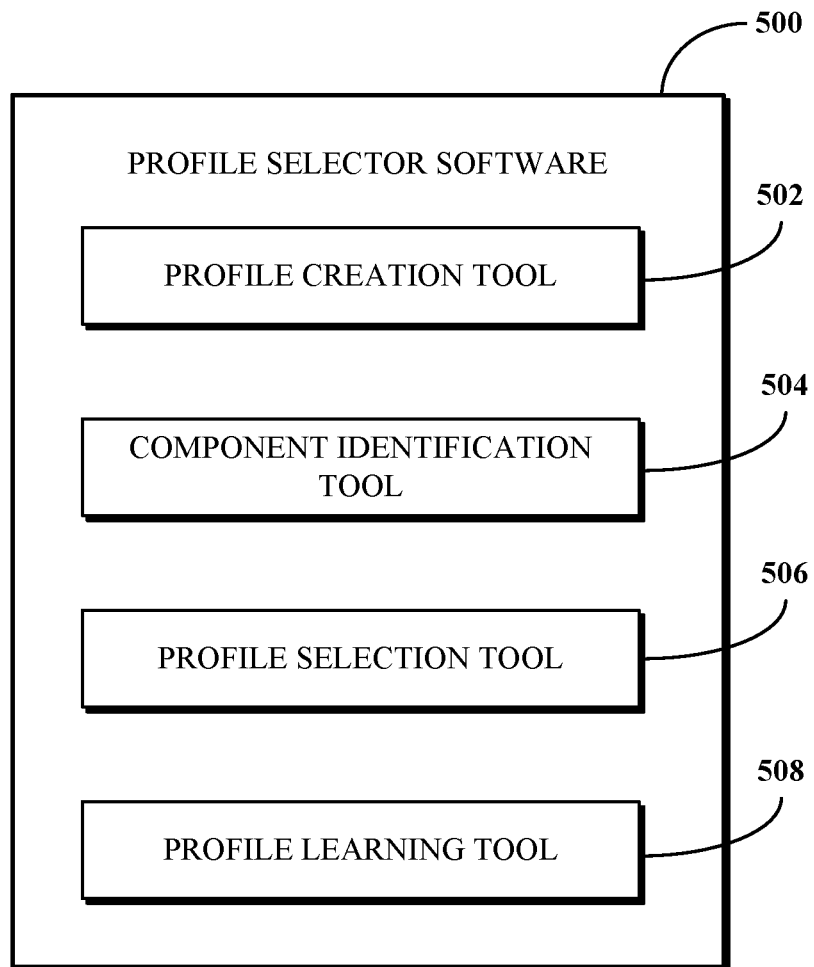
FIG. 5 is a block diagram of example functionality of a profile selector software.

FIG. 5 is a block diagram of example functionality of a profile selector software 500. The profile selector software 500 may be part of or may work in conjunction with a conferencing software usable by a user to join (e.g., attend or present at) conferences, for example, the conferencing software 314 of FIG. 3. The profile selector software 500 includes tools, such as programs, subprograms, functions, routines, subroutines, operations, executable instructions, and/or the like for, inter alia and as further described below, creating conference profiles and configuring a conferencing application based on a selected (e.g., identified) one of the conference profiles. For example, a selected conference profile could be used by the profile selector software 500 to configure the conferencing application with devices the conferencing application should utilize. To illustrate further, based on the user device's location, the profile selector software 500 may select a specific conference profile associated with that location. The profile selector software 500 then configures the conferencing application to use the devices indicated in the selected profile.

The disclosure herein may include statements such as "a profile can be used to configure a client device for a conference," "a conference profile can be used to configure a conference," or "a conference profile can be used configure devices." These and similar statements should be understood to mean that a conferencing software usable at the client device to connect to a conference is configured to use, during the conference, the devices indicated in the conference profile.

At least some of the tools of the profile selector software 500 can be implemented as respective software programs that may be executed by one or more computing devices, such as the computing device 200 of FIG. 2. A software program can include machine-readable instructions that may be stored in one or more memories such as one or more of the memory 204, and that, when executed by one or more processors, such as the processor 202 of FIG. 2, may cause the computing device to perform the instructions of the software program.

As shown, the profile selector software 500 includes a profile creation tool 502, a component identification tool 504, a profile selection tool 506, and a profile learning tool 508. In some implementations, the profile selector software 500 can include more or fewer tools. In some implementations, some of the tools may be combined, some of the tools may be split into more tools, or a combination thereof. Statements herein such as "a tool/software/functionality/etc. of a user or of a profile selector software" should be understood to mean "a tool/software/functionality/etc. of a profile selector software that is executing at or is available to a client device of the user."

The profile selector software 500 may be implemented, at least in part, by a client device (such as the client device 406 of FIG. 4) or at a software platform (such as the software platform 404 of FIG. 4). A profile selector software that is implemented by or is available at a client device may not include some of the tools of the profile selector software 500, and a profile selector software that is implemented by or is available at a software platform may not include some of the tools of the profile selector software 500. In any case, if functionality of a tool of the profile selector software 500 is fully or partially unavailable in the profile selector software of the client device or the software platform, then the profile selector software (of the client device/software platform) may communicate with its counterpart profile selector software (that of the software platform/client device) to access the unavailable functionality. To illustrate, and without limitations, when the profile selector software 500 is implemented at the software platform, then the profile selector software 500 may obtain component identifications (as described with respect to the component identification tool 504) of a client device via a profile selector software available at the client device.

The profile creation tool 502 enables a user to maintain (e.g., create, modify, or delete) conference profiles. In an example, the user may join a conference, configure devices for use in the conference, and may invoke an action that enables the user to create a conference profile. In response to the action, the profile creation tool 502 may identify the configured devices and create a conference profile that includes the configured devices. The conference profile can be associated with (e.g., stored in association with) conference profile identification criteria (or, for brevity, "identification criteria" or "profile identification criteria"). In another example, at the termination of a conference, the profile creation tool 502 may automatically create a conference profile based on the configured devices and associate the conference profile with identification criteria. In an example, the profile creation tool 502 may prompt the user whether a conference profile is to be created (e.g., stored) based on the configured devices.

In a simple example, the identification criteria can be or include a current location of the client device. In an example, the user may associate the identification criteria with multiple locations. As such, the identification criteria can include alternate locations. Other identification criteria are possible, such as those described herein. An example of conference profile is illustrated with respect to FIG. 9.

The location of the client device may be identified (e.g., estimated) using any number of techniques. The location may be identified using a Global Positioning System (GPS) sensor embedded within the client device. The location may be identified using IP geolocation techniques, which may use an IP address of the client device to estimate its physical location. The location may be identified through triangulation of Wi-Fi signals. In an example, the profile selector software 500 may enable the user to have associated therewith multiple locations. As such, the user may be able to associate the profile with one or more locations. For ease of identification, the user can associate a label (such as "HOME") with the location.

Figure 6:
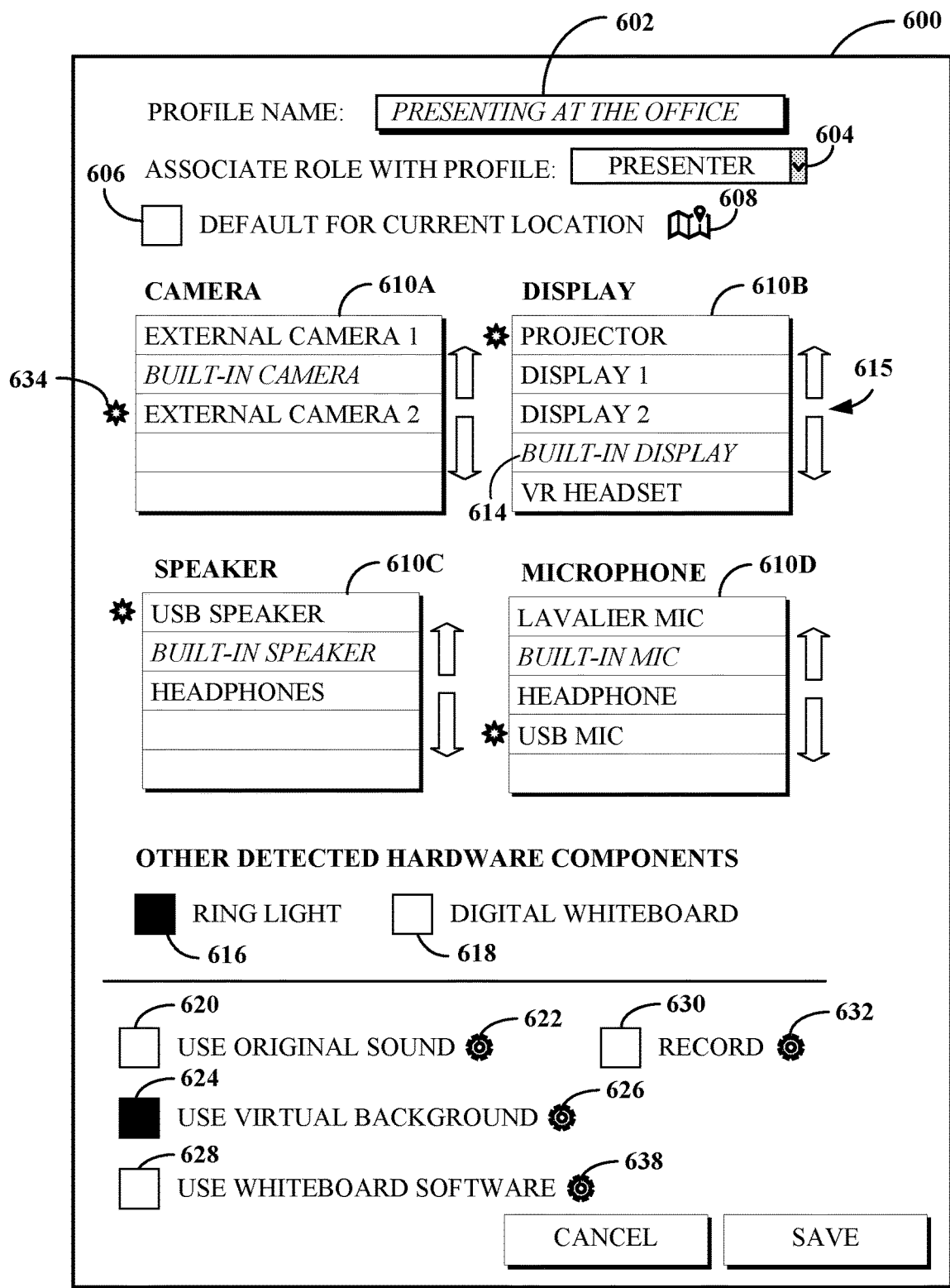
FIG. 6 illustrates an example of a user interface for maintaining conference profiles.

FIG. 6 illustrates an example of a user interface 600 for maintaining conference profiles. The profile creation tool 502 of FIG. 5 may cause the user interface 600 to be displayed at a client device in response to a user of the client device invoking an action to maintain (e.g., create a new or to modify (e.g., edit) an existing) conference profile. In an example, the user may have configured a conferencing application to use devices of the client device in a conference that the user has or is about to join and may cause the user interface 600 to be displayed to save the current configuration in a conference profile. While a certain arrangement and certain user interface controls and interactions are described with respect to the user interface 600, other arrangement, user interface controls, and/or interactions are possible and the disclosure is not limited to or by the user interface 600.

In a field 602, the user may provide a descriptive name for the conference profile. The user interface 600 may include a role selector 604 usable by the user to select and associate a role with the profile. The available roles may be user-defined. The usefulness of associating roles with profiles can be highlighted by assuming scenarios such as when the user is at home, the user may either participate in meetings or conduct virtual piano lessons on a one-on-one basis. In such situations, different input/output devices may be required based on the context (e.g., the role the user is playing in the conference). For instance, while earbuds may suffice for attending meetings, a high-quality external microphone (ideally positioned near a piano) and speakers could be crucial for conducting piano lessons. Therefore, the user has the flexibility to associate two different conference profiles with the 'Home' location, each customized for a distinct role.

While not specifically shown in FIG. 6, the user may be able to associate profile identification criteria with a conference profile. For example, the user may indicate that a profile is to be used for conferences scheduled on Mondays and Wednesdays after 7:00 PM (corresponding to the days and times that the user conducts virtual piano lessons). As further described herein, identification criteria may be automatically detected (e.g., identified or inferred) by the profile learning tool 508.

A selector 606 enables the user to designate the profile as the default profile for the current location (e.g., the current location where the client device is). As such, responsive the client device connecting to a conference, the profile selection tool 506 can automatically configure the client device based on the profile that is designated as the default profile for the location of the client device. A location selector 608 enables the user to associate the profile with multiple locations. More broadly, the user interface 600 may include user controls that the user can use to set profile identification criteria. The user controls may include a day and time selector, a user selector, and other selectors that enable the user to confiture profile identification criteria. The user selector can be used to select (e.g., list) names or email addresses of conference invitees to be included in the profile identification criteria.

The user interface 600 includes device selectors, such as device selectors 610A-610D (e.g., 610A, 610B, 610C, and 610D). The user interface 600 may include a device selector for each type of device that is usable in a conference and devices of that type that are accessible to (e.g., controllable by or via) the client device. To illustrate, the profile selector software 500 (via the component identification tool 504) may recognize that speakers, cameras, displays, microphones, lighting devices, and electronic whiteboard devices connected to the client device may be usable in conferences. On the other hand, the profile selector software 500 may also recognize that a printer, an external hard drive, and a USB desk fan connected to the client device may not be usable (e.g., useful) in conferences. As such, the profile creation tool 502 does not include in the user interface 600 devices and device types not usable in conferences. Whether a device type is usable in a conference may be determined based on a configuration of the conferencing application.

The operations of the device selectors 610A-610D are described mainly with reference to the device selector 610B. The device selector 610B includes all devices of type "DISPLAY" identified by the component identification tool 504 as being currently connected to the client device. Initially, the devices listed in the device selector 610B may be alphabetically sorted. In an example, the client built-in device (such as a built-in device 614) may be listed first and the remaining devices may be sorted alphabetically. In the case that the user is editing an existing conference profile, then the devices are listed in a corresponding device selector according to the order specified in the existing conference profile.

The device selectors 610A-610D include names of devices (e.g., PROJECTOR, DISPLAY 1, etc. for illustrative purposes). The device names shown in FIG. 6 are illustrative and may not correspond to actual names of real-world devices. A name of a device may typically be a string that identifies the device, such as the manufacturer, model number, or serial number of the device. The name of a device may be obtained by the component identification tool 504 by querying the operating system of the client device for the devices connected to the client device. A more realistic example of a device name may be "ACME Z44B Multimedia Speakers," which indicates that the device is a speaker manufactured (or sold) by the ACME corporation and has a model number of Z44B. The built-in devices may be visually distinguishable from the other devices in the device selectors. To illustrate, the built-in display device (e.g., the built-in device 614) is italicized. This is to indicate that the built-in devices may be stored as generic (rather than specific) devices in conference profiles, as further illustrated below.

A re-arranger 615 enables the user to set an order of precedence of the devices. The user can set the order of precedence by moving devices up or down the list using the re-arranger 615. The order of precedence is usable by the profile selection tool 506, as further described herein, such as with respect to FIG. 10.

With respect to some device types, the component identification tool 504 may identify only one of each such devices connected to the client device. In an example, and instead of showing such devices in respective device selectors (e.g., a list user interface control), a different user interface control may be used. FIG. 6 illustrates that a (one) ring lighting device and a (one) digital whiteboard are also connected to the client device. Checkboxes 616 and 618 may be usable by the user to indicate whether, when this profile is used in a conference, to configure the ring lighting device and the digital whiteboard for use in the conference. To illustrate, if the profile indicates that the ring lighting device is to be used, then in response to the profile being selected for use to configure the conferencing application, the profile selector software 500 may turn on the ring lighting device. While not specifically shown in FIG. 6, the user may be able to specify configurations of the ring lighting device (such as a specific color scheme, a specific temperature, and the like).

A conference profile may also include configurations of software features associated with the conferring application. The user interface 600 illustrates that the user can indicate, via checkboxes 620, 624, and 628 whether any of an original sound, a virtual background, or a whiteboard software are to be used in a conference that uses this profile. The conferencing software may apply enhancements (such as noise cancellation and background noise suppression) to voice signals. Via the checkbox 620, the user can indicate that the conferencing software should not enhance sound signals but, rather, the original sound captured via a microphone (which may be indicated the conference profile) should be used in the conference. Original sound may be useful, for example, in the scenario described above related to piano lessons. Via a checkbox 630, the user can indicate whether recording is to be turned on for conferences that use this profile.

Other configurations of software features are possible. For example, the user may be include in the conference profile whether accessibility features (such as closed captions) are enabled; whether a video stream initiated from the user device is to be adjusted for low light; a frame associated with screen sharing by the user at the user device; or whether a background of a video stream associated with the user is to be blurred.

Preference setting controls 622, 626, 638, and 632 enable the user to provide additional configurations of the respective software features. To illustrate, and without limitations, via the preference setting control 626, the user can identify a particular virtual background media (e.g., image) to be used; and via the preference setting control 632, the user may indicate whether recording is to be performed at the client device or in the cloud (e.g., by the software platform 404) and whether a transcript is to be generated.

In an example, the user interface 600 may include indicators (such as an indicator 634) of which devices are currently configured in a conference. To illustrate, a profile may be selected to configure a conference joined by the user. During the meeting, the user may change a device configuration so that a different device than that indicated in the profile is used. The user may then cause the user interface 600 to be displayed. The user interface 600 indicates that, whereas the profile indicates that conferencing application is to be configured to use "EXTERNAL CAMERA 1," the conferencing application is actually configured to use the device "EXTERNAL CAMERA 2," as indicated by the indicator 634.

While not specifically shown in the FIG. 6, in some examples, the user interface 600 may enable the user to specify configurations related to specialized modes, such as a 'presenter' mode, that are facilitated by the conferencing software. The conferencing software may allow a presenter to define which first monitor is used to display shared slides to other participants and which second monitor is utilized to display presenter notes. As such, via the user interface 600, the user may incorporate such preferences into a conference profile associated with a presenter role. The preferences may specify which first monitor will be used to automatically share slides during conferences and which second monitor will be used to display presenter notes.

Referring again to FIG. 5, the component identification tool 504 can be used in conjunction with the profile creation tool 502 and the profile selection tool 506. In the process of creating or modifying a profile, the component identification tool 504 can be used to identify which devices are currently available at the client device and which devices are currently configured to be used in an ongoing conference.

The component identification tool 504 may query the operating system of the client device to obtain device information regarding the devices connected to the client device. The device information may include a device type, a unique identifier of the device, a manufacturer of the device, a name of the device, and/or other information that can be provided by the operating system. In an example, the component identification tool 504 may query some of the devices themselves to obtain respective device information. At least some of the device information can be displayed in the user interface 600 of FIG. 6.

When a profile is selected for use in a conference, the profile creation tool 502 can also be used to identify the devices for use in the conference. The profile may be selected automatically, such as based on profile identification criteria associated with the profile. Selecting a conference profile based on profile identification criteria can include identifying profile selection criteria (e.g., a current state) relating to the conference and/or the user and determining that the profile selection criteria match the profile identification criteria associated with the conference profile. The profile may be selected by a user for use in a conference. Configuring a conference according to (e.g., based on) the conference profile is further described with respect to FIG. 10.

The profile selection tool 506 can be used to select a conference profile. The profile selection tool 506 configures a conferencing application to use devices of the client device as indicated in the selected profile. In an example, the profile can be automatically selected. For example, in response to the user joining a conference using a client device, the profile selection tool 506 may identify that profile identification criteria are matched by a current state. The current state can be or include a location of the client device. Other profile identification criteria are further described herein and with respect to the profile learning tool 508.

In another example, the profile may be selected by a user. For example, via a user interface control, the user may select a profile from amongst profiles that the user created or are otherwise available to the user. In an example, and in response to joining a conference, the profile selection tool 506 may cause a user interface (such as described with respect to FIG. 7) to be displayed and that is usable by the user to select a profile.

Figure 7:
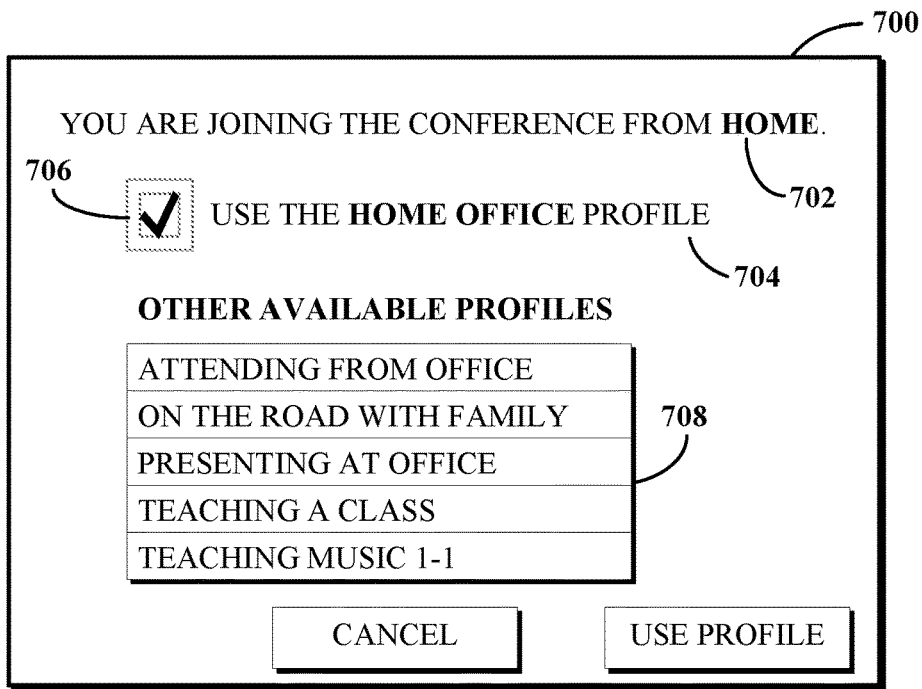
FIG. 7 is an example of a user interface for selecting a conference profile.

FIG. 7 is an example of a user interface 700 for selecting a conference profile. The user interface 700 can be displayed by the profile selection tool 506 of FIG. 5. The user interface 700 or variants thereof may be presented in a case that a default profile is not identified based on identified profile selection criteria. The user interface may be presented in a case where zero or more than one profile is identified based on profile selection criteria. The user interface 700 or variants thereof may be presented in response to a user action that causes the user interface 700 to be displayed.

In an example, the user may use the user interface 700 to select a profile that may be different than a currently configured profile. To illustrate, the user may have joined a conference using their cellular phone where a profile uses an external USB speaker and an external USB microphone located in the user's home office. However, during the conference, the user decides to continue attending the conference while driving. As such, the user may select a conference profile that can be used to configure a conferencing application executing at the cellular phone to use the Bluetooth speaker and microphone of user's vehicle.

The user interface 700 illustrates that a profile selection criterion or current state 702 (e.g., the location of the client device via which the user is connected to a conference) is identified as the HOME location. A default profile 704 associated with (or matched to) the profile selection criterion (e.g., the location) is identified. A check box 706 indicates that the default profile 704 is currently enabled (e.g., used to configure the conferencing application via which the client device is connected to the conference). A profiles list 708 lists the profiles available to the user. The user can select one of the listed profiles to change the configuration of the conferencing application.

The list of available profiles can include profiles created by the user and profiles that may be created by an administrator and shared with the user. To illustrate, a conference room may be equipped with high-quality conferencing equipment and a profile may be created by an administrator such that a presenter (or a client device therefor) located in the conference room can easily configure their client device (e.g., a conferencing application therein) to use the high-quality conferencing equipment.

Referring again to FIG. 5, the profile learning tool 508 can identify profile identification criteria and corresponding conference profiles. The profile learning tool 508 may be or include a machine-learning (ML) model that can identify profile identification criteria.

Figure 8:
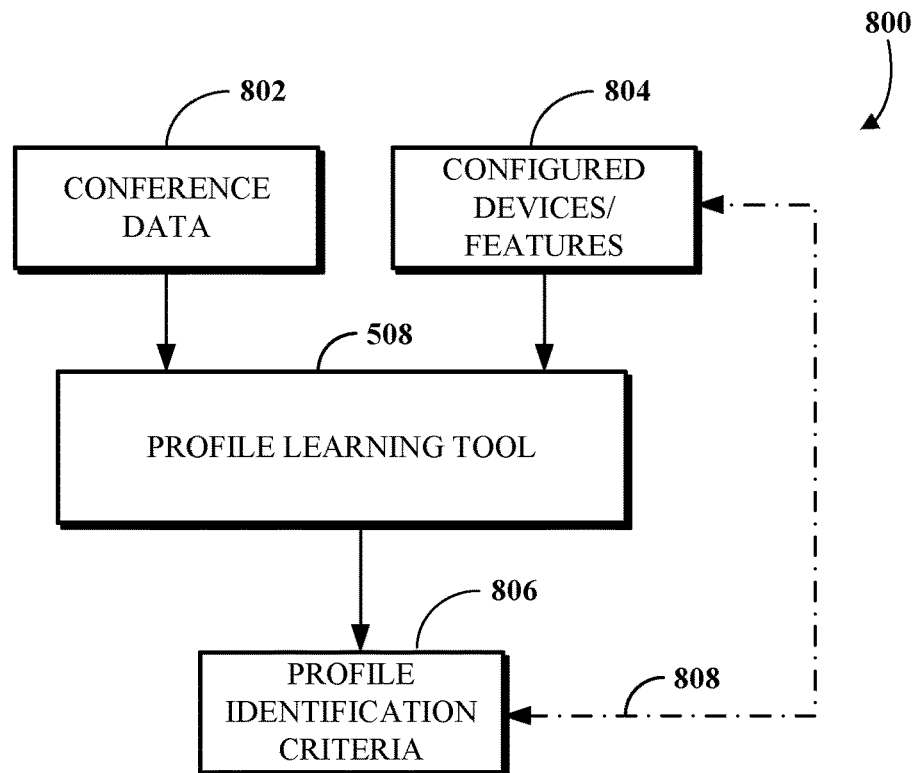
FIG. 8 illustrates an example of using (e.g., training) a profile learning tool.

FIG. 8 illustrates an example 800 of using (e.g., training) the profile learning tool 508. The profile learning tool 508 can receive conference data 802 relating to prior (historical) conferences that a user has attended. The profile learning tool 508 can also receive configurations 804 used in those prior conferences. As mentioned, the profile learning tool 508 may be or include an ML model. Any number of techniques can be used to train the ML model. In an example, the ML model may use association mining techniques to identify profile identification criteria and corresponding conference profiles. In an example, the ML model can be a neural network, such as a fully connected network. In an example, the ML model may be a support vector machine. However, other suitable techniques can also be used.

The conference data 802 can include, for each conference, metadata associated with the conference, attendees of the conference, a location of the client device when the user attended the conference, and other conference data usable for identifying profile identification criteria. The metadata associated with a conference may include a subject (e.g., title), time and day of the conference, a duration of the conference, whether to conference is recurring, and/or other metadata. The configurations 804 can include, for each of the conferences, the devices and/or features used to configure a conferencing application for that conference.

The profile learning tool 508 can detect (e.g., identify or infer) common patterns or characteristics within the conference data 802 and the related configurations 804. These common aspects identified within the conference data 802 can serve as profile identification criteria 806 for the corresponding configurations. As depicted by an arrow 808, the profile learning tool 508 can store relationships between the profile identification criteria 806 and corresponding configurations. As such, the profile learning tool 508 can learn (e.g., identify), create, and store profile identification criteria, corresponding conference profiles, and associations therebetween.

When a user joins a conference, the profile creation tool 502 can utilize these associations to identify (e.g., select) a suitable conference profile. For instance, upon receiving a request from the profile creation tool 502 to identify a conference profile, the profile selection tool 506 can extract profile selection criteria (e.g., a current state) based on the conference and/or the user. The profile creation tool 502 can use the profile learning tool 508 or the associations generated thereby to identify (e.g., select) an appropriate conference profile. To illustrate, using but a simple, non-limiting example, the profile learning tool 508 may learn that the user always uses particular external camera, projector, and USB microphone and records conferences whose subjects (e.g., titles) include the word "Quarterly." The profile learning tool 508 can therefrom associate a corresponding conference profile with the profile identification criteria. In an example, a conference profile may be selected (e.g., identified) based on a partial match between the identifying criteria and profile identification criteria.

FIG. 9 illustrates an example 900 of contents of a conference profile. The example 900 illustrates a portion of a conference profile. A conference profile may be stored in a format (e.g., as structured data) in a data store. In an example, the conference profile may be stored as an XML string, a JavaScript Object Notation (JSON) string, or in some other format.

A field 902 indicates the name of the conference profile. A tag 904 delineates the start of a section that lists devices, by device type, usable in a conference according to the profile and their order of selection. A section 906 includes the order of devices of type "MONITOR" and a section 908 includes the order of devices of type "SPEAKER."

The example 900 illustrates that a projector named "CO_ONE C2020H PROJECTOR" described in a section 910 and having an order of "1" is to be used first, if available. If the monitor indicated in section 910 is not available, then the conferencing software is configured to use a second monitor having an order of "2," and so on.

The values of the NAME and UNIQUE_ID (i.e., unique device identifier) fields can be obtained from the operating system of the client device and/or from the devices themselves. In the example 900, a built-in monitor (e.g. a built-in display of a laptop or an all-in-one computer), indicated by a name field 912, is listed as the fourth device in the order (e.g., ORDER="4"). A built-in device does not have a unique ID listed. Rather, a built-in device may be logically identified as "built-in." This facilitates reuse of profiles, such as when a user replaces their client device (e.g., laptop) with another. When the user replaces their laptop, they may retain use of all other peripheral (external) devices. If a profile included specific identifiers of the built-in devices, the profile would then include devices no longer available when the user replaced their laptop.

Figure 10:
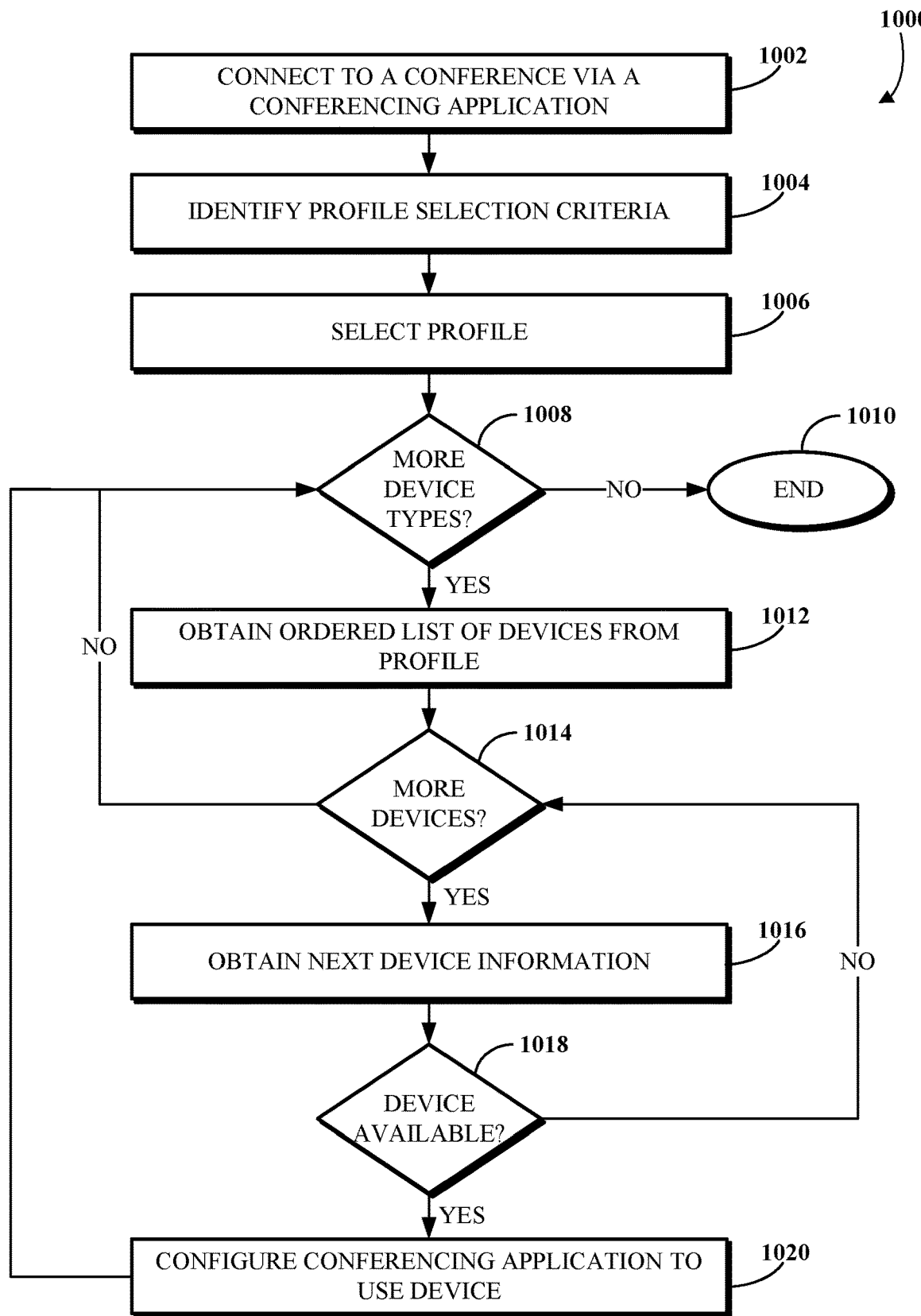
FIG. 10 is a flowchart of an example of a technique for configuration a conferencing application executing at a client device of a user based on a conference profile.

To further describe some implementations in greater detail, reference is next made to examples of techniques which may be performed by or using a system for creating and using a script in a conference. FIG. 10 is a flowchart of an example of a technique 1000 for configuration a conferencing application executing at a client device of a user based on a conference profile.

The technique 1000 can be executed using computing devices, such as the systems, hardware, and software described with respect to FIGS. 1-9. The technique 1000 can be performed, for example, by executing one or more machine-readable programs or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof. The technique can be performed in whole or in part by a profile selector software, such as the profile selector software 500 of FIG. 5.

At 1002, the client device of a user is connected to a conference. The client device may be connected to the conference in response to a request by the user to join the conference. At 1004, profile selection criteria (e.g., a current state) are identified. In an example, the profile selection criteria can be or include a location of the client device. The location of the client device can be identified as described herein. In an example, the profile selection criteria can be identified based on conference data (e.g., invitees, subject or title, a time of day of the conference, and so on) associated with the conference. At 1006, a conference profile is selected based on the profile selection criteria. That is, the profile selection criteria are matched to respective profile identification criteria associated with conference profiles.

The technique 1000 then proceeds to configure the conferencing application based on the conference profile. That is, for each device type included in the conference profile, the technique 1000 configures the conferencing application based on the order of the devices listed for the device type. As such, at 1008, the technique 1000 identifies whether additional device types are listed in the conference profile. If so, the technique 1000 proceeds to 1012; otherwise the technique 1000 ends at 1010. In an example, and as described above, the conference profile may include configurations of software features associated with the conferencing application. As such, from 1008, the technique 1000 may proceed to further configure the conferencing application according to the conference profile.

At 1012, the technique 1000 obtains (e.g., reads) a sorted list of devices for the device type. To be more specific, the technique 1000 obtains the identifying information (e.g., unique identifiers) listed with respect to the device type. The technique 1000 identifies, according to the order of the devices, which of devices is available (e.g., is connected to the client device). As such, at 1014, the technique 1000 determines whether more devices are listed. If so, then the technique 1000 proceeds to 1016; otherwise, the technique 1000 proceeds back to 1008 to configure a device for the next device type (if any).

At 1016, the technique 1000 retrieves data related to the next device in the ordered list of devices, as specified in the conference profile. At 1018, the technique 1000 then determines whether the specified device is accessible or is otherwise connected to the client device. For example, the technique 1000 may interact with the operating system of the client device, issuing a query to determine if a device, whose identifier matches that of the next device, is presently connected to the client device. If the next device is available and connected, the technique 1000 proceeds to 1020; otherwise, if the device is not connected or is otherwise unavailable, then the technique 1000 reverts back to 1014. At 1020, the conferencing application is configured to use the device. For example, using an Application Programming Interface (API) of the conferencing application, the technique 1000 can configure the conferencing application to use a particular device (or to configure a software feature therefor).

A conference profile may not specifically indicate, with respect to device type, that a built-in device is to be used or an order therefor. In an example, if none of the devices associated with a device type are determined to be available, then the technique 1000 may configure the conferencing application to use an appropriate built-in device.

Figure 11:
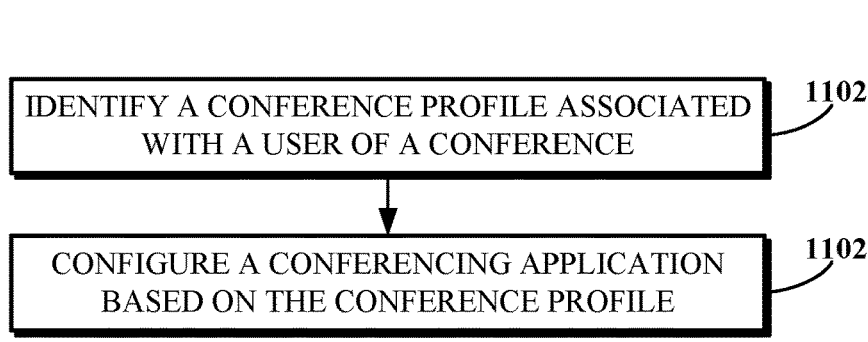
FIG. 11 is a flowchart of an example of a technique for configuring a conferencing application executing at a client device of a user based on conference profiles.

FIG. 11 is a flowchart of an example of a technique 1100 for configuring a conferencing application executing at a client device of a user based on conference profiles. The technique 1100 can be executed using computing devices, such as the systems, hardware, and software described with respect to FIGS. 1-9. The technique 1100 can be performed, for example, by executing one or more machine-readable programs or other computer-executable instructions, such as routines, instructions, programs, or other code. The steps, or operations, of the technique 1100, or another technique, method, process, or algorithm described in connection with the implementations disclosed herein can be implemented directly in hardware, firmware, software executed by hardware, circuitry, or a combination thereof. The technique can be performed in whole or in part by a profile selector software, such as the profile selector software 500 of FIG. 5.

At 1102, a conference profile associated with the user of the conference is identified. As described above, the conference profile may specify a peripheral device connected to the user device of the user. The peripheral device can be one of an external camera, an external microphone, or an external speaker connected to the user device.

The conference profile can be identified by an ML model based on a current state associated with at least one of the conference or the user. The ML model can be as described with respect to the profile learning tool 508 of FIG. 5. The ML model can be trained to identify an association between the peripheral device and the current state based on a history of configurations of conferencing applications used by the user.

In an example, the current state can include a location of the user device. The location can be a geolocation. The location can be identified based on triangulation (e.g., triangulation of Wi-Fi signals). The current state can include a role of the user associated with the conference. The current state can include at least one of a date or a time of the conference.

In an example, identifying the conference profile can include selecting the conference profile from a set of conference profiles that includes a first profile associated with a first physical space (e.g., a first location, such as a home) and a second profile associated with a second physical space (e.g., second location, such as an office). The first profile may specify (e.g., include or indicate) a first one or more peripheral devices in association with the first physical space, and the second profile may specify second one or more peripheral devices in association with the second physical space. That is, the first profile indicates that the conferencing application is to be configured based on the first one or more peripheral devices; and the second profile indicates that the conferencing application is to be configured based on the second one or more peripheral devices. At 1104, the conferencing application is configured to use the peripheral device during the conference based on the conference profile.

As mentioned above, the conference profile may include settings related to software features. As such, in an example, the conference profile can indicate that a virtual background is to be enabled; and the virtual background can be enabled based on the conference profile.

In an example, the technique 1100 may include identifying the conference profile for another (second) conference. The peripheral device may be determined to be unavailable while the user is joined to the second conference. The user may have joined the second conference using the same or a different user device. In response to determining that the peripheral device is unavailable, the conferencing application may be configured to use another peripheral device based on the conference profile (if that other peripheral device is available).

Figure 12:
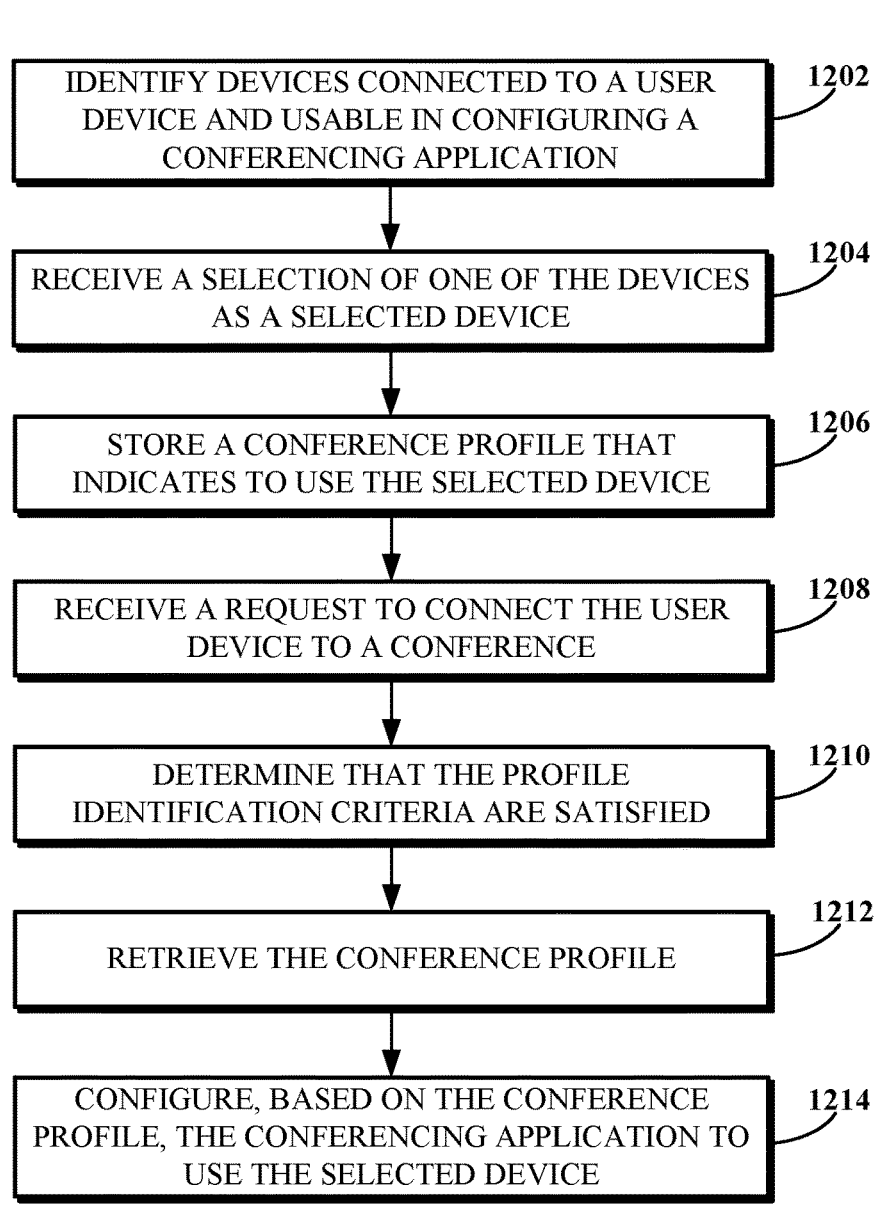
FIG. 12 is a flowchart of an example of a technique for creating and using conference profiles.

FIG. 12 is a flowchart of an example of a technique 1200 for creating and using conference profiles. A conferencing application executing at a client device of a user can be configured based on of the conference profiles. The technique 1200 can be executed using computing devices, such as the systems, hardware, and software described with respect to FIGS. 1-9. The technique 1200 can be performed, for example, by executing one or more machine-readable programs or other computer-executable instructions, such as routines, instructions, programs, or other code. The steps, or operations, of the technique 1200, or another technique, method, process, or algorithm described in connection with the implementations disclosed herein can be implemented directly in hardware, firmware, software executed by hardware, circuitry, or a combination thereof. The technique can be performed in whole or in part by a profile selector software, such as the profile selector software 500 of FIG. 5.

At 1202, devices that are connected to the user device and usable in configuring the conferencing application are identified. The devices can be any peripheral or integrated (built-in) equipment that can enhance or is necessary for the functionality of the conferencing application. The devices can include a camera, a webcam, a microphone, speakers, and the like.

At 1204, a selection of one of the devices is received. For ease of reference, the one of the devices is referred to as a 'selected device.' The selection of the device may be as described with respect to FIG. 5. In an example, the user may select the one of the devices. In an example, the one of the devices may be determined to be selected because the conferring application was already configured to use the device. In an example, the selected device may be associated with a device type.

At 1206, a conference profile is stored in association with specific profile identification criteria (i.e., one profile identification criterion or more than one profile identification criteria). The conference profile indicates to use the selected device. That is, the conference profile indicates that, when the conference profile is selected for a conference, the conferencing software is to be configured to use the selected device. The conference profile may be stored in a memory of the user device and/or a memory, such as data store, associated with the software platform 404.

At 1208, a request is received to connect the user device to a conference using the conferencing application. In an example, the user may invoke an action (e.g., such as by clicking on a conference link) that transmits, such as to the software platform 404, the request to connect the user device to the conference.

At 1210, the profile identification criteria is determined to be satisfied based on receiving the request to connect the user device to the conference. As described above, the profile identification criteria is determined to be satisfied in response to determining that the profile identification criteria match a current state (or profile selection criteria).

At 1212, upon determining that the profile identification criteria are satisfied, the conference profile is retrieved, such as from the memory. Determining that the profile identification criteria are satisfied can include determining that a location of the user device matches a location indicated in the profile identification criteria.

At 1214, the technique 1200 configures, based on the retrieved conference profile, the conferencing application to use the selected device during the conference. Configuring the conferencing application to use the selected device includes attempting to configure the conferencing application to use the selected device. As such, in an example, configuring the conferencing application can include determining that the selected device is unavailable and configuring, based on the conference profile, the conferencing application to use a second device. The conference profile can indicate to use the second device when the selected device is unavailable. In an example, configuring the conferencing application can include determining that the selected device is unavailable and configuring the conferencing application to use a built-in device of the user device instead of the selected device.

An indication to use a second device when the selected device is unavailable may be stored in the conference profile. An indication of whether to enable a virtual background in conferences configured based on the conference profile can be included in the conference profile. An indication of whether original sound is used in conferences configured based on the conference profile can be included in the conference profile.

In an example, the technique 1200 can further include receiving a request to connect the user device to another conference. A selection of the conference profile from amongst a set of conference profiles may be received from a user of the user device. The conferencing application is then configured based on the conference profile.

For simplicity of explanation, the techniques 1000, 1100, and 1200 of FIGS. 10, 11, and 12, respectively, are each depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter. Some of the steps or operations may be performed in parallel or asynchronously.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a method may include identifying devices connected to an user device and usable in configuring a conferencing application. The method may include receiving a selection of one of the devices as a selected device. The method may include storing, in association with a profile identification criterion, a conference profile that indicates to use the selected device. The method may include receiving a request to connect the user device to a conference using the conferencing application. The method may include determining that the profile identification criterion is satisfied based on the request. The method may include, in response to determining that the profile identification criterion is satisfied, retrieving the conference profile. The method may include configuring, based on the conference profile, the conferencing application to use the selected device during the conference. Other embodiments of this aspect include corresponding computer systems, apparatus, and computer programs recorded on one or more computer storage devices, each configured to perform the actions of the methods.

Implementations may include one or more of the following features. The method may include: including, in the conference profile, an indication to use a second device when the selected device is unavailable. The method may include: including, in the conference profile, an indication of whether to enable a virtual background in conferences configured based on the conference profile. The method may include: including, in the conference profile, an indication of whether original sound is used in conferences configured based on the conference profile. The method where configuring, based on the conference profile, the conferencing application to use the selected device may include: determining that the selected device is unavailable; and configuring the conferencing application to use a built-in device in response to determining that the selected device is unavailable. The method where configuring, based on the conference profile, the conferencing application to use the selected device may include: determining that the selected device is unavailable; and configuring the conferencing application to use a built-in device of the user device instead of the selected device. The method where determining that the profile identification criterion is satisfied may include: determining that a location of the user device matches a location of the profile identification criterion. The method may include: receiving a request to connect the user device to another conference; receiving, from an user of the user device, a selection of the conference profile from a set of conference profiles; and configuring, for the other conference, the conferencing application based on the conference profile. Implementations of the described techniques may include hardware, a method or process, or a computer tangible medium.

In one general aspect, a system may include one or more memories and one or more processors. The one or more processors may be configured to execute instructions stored in the one or more memories to: identify devices connected to an user device and usable in configuring a conferencing application; receive a selection of one of the devices as a selected device; store, in association with a profile identification criterion, a conference profile that indicates to use the selected device; receive a request to connect the user device to a conference using the conferencing application; determine that the profile identification criterion is satisfied based on the request; in response to determining that the profile identification criterion is satisfied, retrieve the conference profile; and configure, based on the conference profile, the conferencing application to use the selected device during the conference. Other embodiments of this aspect include corresponding computer systems, apparatus, and computer programs recorded on one or more computer storage devices, each configured to perform the actions of the methods.

Implementations may include one or more of the following features. The system where the profile identification criterion may include a criterion related to a location of the user device. The system where the profile identification criterion may include a criterion related to conference invitees. The system where the profile identification criterion may include a criterion related to conference metadata. The system where the conference profile includes an identifier of the selected device. The system where the conference profile indicates that another device that is different from the selected device is to be used in case the selected device is unavailable. The system where the selected device is an external device to the user device, and where the conference profile indicates that a built-in device is to be used when the selected device is unavailable. The system where the selected device is stored in the conference profile in association with a device type. The system where to configure, based on the conference profile, the conferencing application to use the selected device may include instructions to: blur a background of a video stream obtained from a camera of the user device based on an indication in the conference profile to blur the background. Implementations of the described techniques may include hardware, a method or process, or a computer tangible medium.

In one general aspect, a non-transitory computer readable medium storing instructions operable to cause one or more processors to perform operations. The operations may include identifying devices connected to an user device and usable in configuring a conferencing application; receiving a selection of one of the devices as a selected device; storing, in association with a profile identification criterion, a conference profile that indicates to use the selected device; receiving a request to connect the user device to a conference using the conferencing application; determining that the profile identification criterion is satisfied based on the request; in response to determining that the profile identification criterion is satisfied, retrieving the conference profile; and configuring, based on the conference profile, the conferencing application to use the selected device during the conference. Other embodiments of this aspect include corresponding computer systems, apparatus, and computer programs recorded on one or more computer storage devices, each configured to perform the actions of the methods.

Implementations may include one or more of the following features. The non-transitory computer readable medium where the operations include enabling a virtual background in response to determining that the conference profile includes an indication to enable the virtual background. The non-transitory computer readable medium where the conference profile includes an indication of a first monitor usable for sharing slides and a second monitor usable for displaying speaker notes during the conference. Implementations of the described techniques may include hardware, a method or process, or a computer tangible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    identifying devices connected to a user device and usable in configuring a conferencing application;
    receiving a selection of one of the devices as a selected device;
    storing, in association with a profile identification criterion, a conference profile that indicates to use the selected device;
    receiving a request to connect the user device to a conference using the conferencing application;
    determining that the profile identification criterion is satisfied based on the request;
    in response to determining that the profile identification criterion is satisfied, retrieving the conference profile;
    determining whether the selected device is unavailable; and
    configuring, based on the conference profile, the conferencing application to use a built-in device of the user device instead of the selected device in response to determining that the selected device is unavailable.

2. The method of claim 1, further comprising:
    including, in the conference profile, an indication to use a second device when the selected device is unavailable.

3. The method of claim 1, further comprising:
    including, in the conference profile, an indication of whether to enable a virtual background in conferences configured based on the conference profile.

4. The method of claim 1, further comprising:
    including, in the conference profile, an indication of whether original sound is used in conferences configured based on the conference profile.

5. The method of claim 1, wherein determining that the profile identification criterion is satisfied comprises:
    determining that a location of the user device matches a location of the profile identification criterion.

6. The method of claim 1, further comprising:
    in response to determining that the selected device is available, configuring the conferencing application to use the selected device.

7. The method of claim 1, wherein determining that the profile identification criterion is satisfied comprises:
    determining that a location of the user device matches a location of the profile identification criterion.

8. The method of claim 1, further comprising:
    receiving a request to connect the user device to another conference;
    receiving, from a user of the user device, a selection of the conference profile from a set of conference profiles; and
    configuring, for the another conference, the conferencing application based on the conference profile.

9. A system, comprising:
    one or more memories; and one or more processors, the one or more processors configured to execute instructions stored in the one or more memories to:
- identify devices connected to a user device and usable in configuring a conferencing application;
- receive a selection of one of the devices as a selected device;
- store, in association with a profile identification criterion, a conference profile that indicates to use the selected device;
- receive a request to connect the user device to a conference using the conferencing application;
- determine that the profile identification criterion is satisfied based on the request;
- in response to determining that the profile identification criterion is satisfied, retrieve the conference profile;
- determine whether the selected device is unavailable; and
- configure, based on the conference profile, the conferencing application to use a built-in device of the user device instead of the selected device in response to determining that the selected device is unavailable.

10. The system of claim 9, wherein the profile identification criterion comprises a criterion related to a location of the user device.

11. The system of claim 9, wherein the profile identification criterion comprises a criterion related to conference invitees.

12. The system of claim 9, wherein the profile identification criterion comprises a criterion related to conference metadata.

13. The system of claim 9, wherein the conference profile includes an identifier of the selected device.

14. The system of claim 9, wherein the conference profile indicates that another device that is different from the selected device is to be used in case the selected device is unavailable.

15. The system of claim 9, wherein the selected device is an external device to the user device, and wherein the conference profile indicates that a built-in device is to be used when the selected device is unavailable.

16. The system of claim 9, wherein the selected device is stored in the conference profile in association with a device type.

17. The system of claim 9, wherein to configure, based on the conference profile, the conferencing application further comprises instructions to:
- blur a background of a video stream obtained from a camera of the user device based on an indication in the conference profile to blur the background.

18. A non-transitory computer readable medium storing instructions operable to cause one or more processors to perform operations comprising, comprising:
- identifying devices connected to a user device and usable in configuring a conferencing application;
- receiving a selection of one of the devices as a selected device;
- storing, in association with a profile identification criterion, a conference profile that indicates to use the selected device;
- receiving a request to connect the user device to a conference using the conferencing application;
- determining that the profile identification criterion is satisfied based on the request;
- in response to determining that the profile identification criterion is satisfied, retrieving the conference profile;
- determining whether the selected device is unavailable; and
- configuring, based on the conference profile, the conferencing application to use a built-in device of the user device instead of the selected device in response to determining that the selected device is unavailable.

19. The non-transitory computer readable medium storing of claim 18, further comprising:
- enabling a virtual background in response to determining that the conference profile includes an indication to enable the virtual background.

20. The non-transitory computer readable medium storing of claim 18, wherein the conference profile includes an indication of a first monitor usable for sharing slides and a second monitor usable for displaying speaker notes during the conference.

* * * * *